United States Patent
Chen et al.

(10) Patent No.: US 8,145,921 B2
(45) Date of Patent: *Mar. 27, 2012

(54) MULTI-REGULATOR POWER SUPPLY CHIP WITH COMMON CONTROL BUS

(75) Inventors: Chun-ying Chen, Irvine, CA (US);
Pieter Vorenkamp, Laguna Niguel, CA (US); Neil Y. Kim, Laguna Niguel, CA (US); Sumant Ranganathan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 12/401,178

(22) Filed: Mar. 10, 2009

(65) Prior Publication Data

US 2009/0177899 A1    Jul. 9, 2009

Related U.S. Application Data

(63) Continuation of application No. 11/158,142, filed on Jun. 21, 2005, now Pat. No. 7,509,507.

(60) Provisional application No. 60/583,998, filed on Jun. 29, 2004.

(51) Int. Cl.
*G06F 1/26* (2006.01)

(52) U.S. Cl. ........ 713/300; 713/310; 713/320; 713/321; 713/322; 713/324; 713/330; 713/340; 365/227; 307/43; 307/58; 307/82; 323/282

(58) Field of Classification Search .............. 713/300, 713/310, 320–324, 330, 340; 365/227; 323/282; 307/43, 58, 82
See application file for complete search history.

(56) References Cited

U.S. PATENT DOCUMENTS

| | | | |
|---|---|---|---|
| 7,000,125 B2 | 2/2006 | Chapuis et al. | |
| 7,085,943 B2 | 8/2006 | Chun et al. | |
| 7,293,181 B2 * | 11/2007 | Wierzbicki | 713/300 |
| 7,509,507 B2 * | 3/2009 | Chen et al. | 713/300 |
| 7,581,122 B2 * | 8/2009 | Kim et al. | 713/300 |
| 2002/0046354 A1 * | 4/2002 | Ostrom et al. | 713/300 |
| 2002/0135338 A1 * | 9/2002 | Hobrecht et al. | 323/272 |
| 2004/0008996 A1 * | 1/2004 | Aronson et al. | 398/202 |
| 2004/0090219 A1 | 5/2004 | Chapuis | |
| 2004/0123164 A1 | 6/2004 | Chapuis et al. | |

OTHER PUBLICATIONS

Anonymous, "Integrated Voltage Regulator for an On-Card + 1.7 Volt Power Supply", IBM Technical Disclosure Bulletin, vol. 31 No. 2, Jul. 1, 1988, pp. 22-23, New York, USA, XP002344799.
European Search Report for Application No. 05013691.0, Sep. 30, 2005.

* cited by examiner

*Primary Examiner* — M Elamin
(74) *Attorney, Agent, or Firm* — Brinks Hofer Gilson & Lione

(57) ABSTRACT

A system and method for implementing a common control bus in a multi-regulator power supply integrated circuit. The integrated circuit may, for example, comprise first and second power regulator modules that control at least one characteristic of respective power signals. The integrated circuit may also, for example, comprise a communication interface module that receives power control information related to operation of the first and second power regulator modules over a shared data bus. An exemplary method may, for example, comprise receiving power control information over a data bus. The method may also, for example, comprise determining which of a plurality of power regulators corresponds to the received power control information. The method may further, for example, comprise determining a regulator control signal, based at least in part on the received power control information, and provide the regulator control signal to the determined regulator(s) to control operation of the determined regulator(s).

33 Claims, 3 Drawing Sheets

MULTI-REGULATOR POWER SUPPLY CHIP WITH COMMON CONTROL BUS

CROSS-REFERENCE TO RELATED APPLICATIONS/INCORPORATION BY REFERENCE

The present application is a continuation of U.S. application Ser. No. 11/158,142, filed Jun. 21, 2005, now U.S. Pat. No. 7,509,507 which claims benefit from and priority to U.S. Provisional Application No. 60/583,998, filed Jun. 29, 2004, and entitled "MULTI-REGULATOR POWER SUPPLY CHIP WITH COMMON CONTROL BUS;". The above-identified applications are hereby incorporated herein by reference in their entirety.

FEDERALLY SPONSORED RESEARCH OR DEVELOPMENT

Not Applicable

SEQUENCE LISTING

Not Applicable

MICROFICHE/COPYRIGHT REFERENCE

Not Applicable

BACKGROUND OF THE INVENTION

Various electronic circuit components (e.g., integrated circuits or modules thereof) may have various respective power requirements. Such power requirements may, for example, vary between or within circuits, sub-circuits, integrated circuits or modules. Such power requirements may, for example, vary over time, temperature, operating mode, real-time operating conditions, etc.

Also, energy utilization of an integrated circuit or module (or group thereof) may affect the level or other characteristics of power supplied to one or more other integrated circuits or modules. Accordingly, the characteristics of power being provided to an integrated circuit or module may change over time and/or operating conditions.

In general, various electronic circuit components may simultaneously utilize power from a common power regulator or a plurality of respective independent power regulators. A power supply circuit (e.g., a power supply integrated circuit), or power management unit, may comprise a plurality of power regulator modules to satisfy disparate power consumption needs by controlling various characteristics of electrical power. A power supply integrated circuit that comprises a plurality of power regulator modules presents various power regulator control challenges.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for implementing a common control bus in a multi-regulator power supply integrated circuit, substantially as shown in and/or described in connection with at least one of the figures, as set forth more completely in the claims.

These and other advantages, aspects and novel features of the present invention, as well as details of illustrative aspects thereof, will be more fully understood from the following description and drawings.

DETAILED DESCRIPTION OF THE INVENTION

Figure 1:
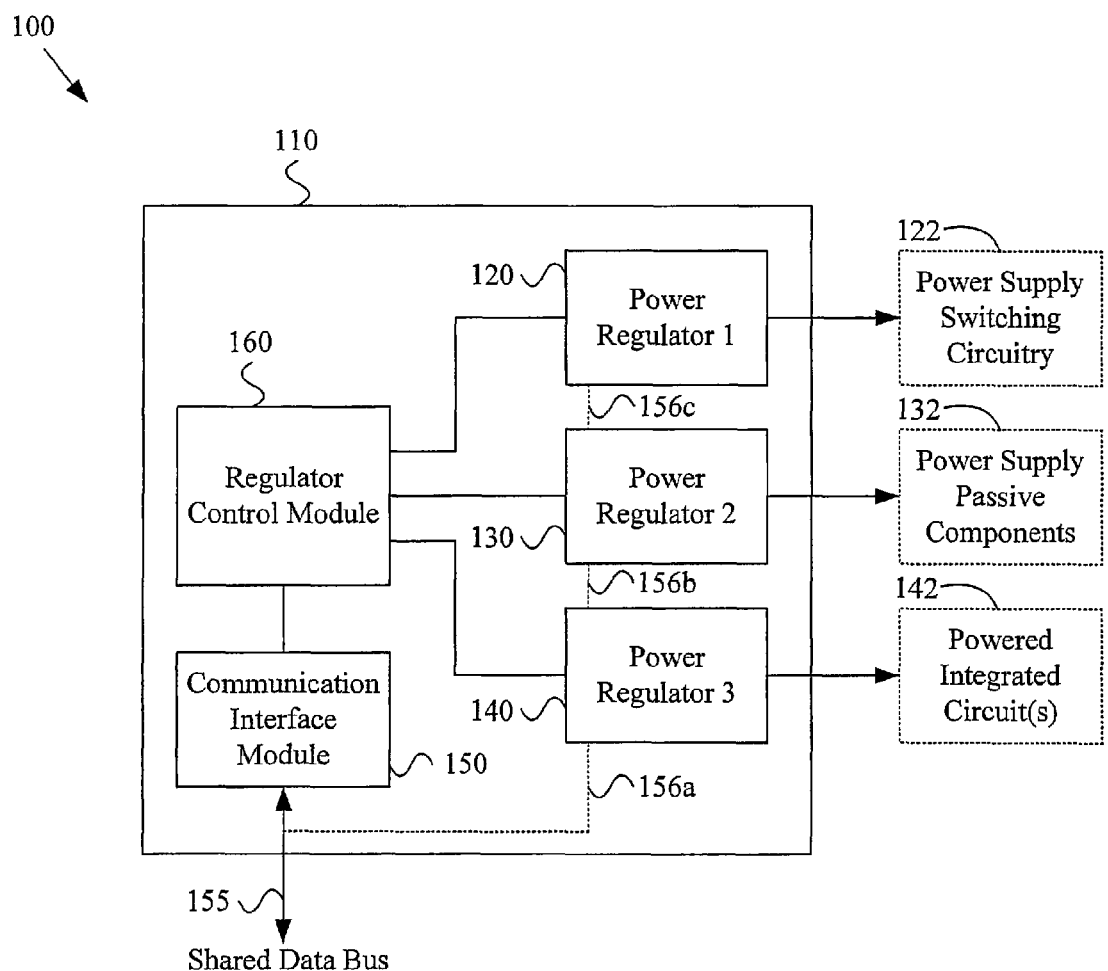
FIG. 1 shows a block diagram of an exemplary system having an integrated circuit comprising multiple regulators controlled through a shared data bus, in accordance with various aspects of the present invention.

FIG. 1 shows a block diagram of an exemplary system 100 having an integrated circuit comprising multiple regulators controlled through a shared data bus, in accordance with various aspects of the present invention. The exemplary system 100 may comprise aspects of any of a large variety of electrical systems and/or circuits. For example and without limitation, the exemplary system 100 may comprise characteristics of a signal processing system, computer system, communication system, user interface system, etc. Accordingly, the scope of various aspects of the present invention should not be limited by characteristics of a particular electrical system and/or circuit.

The exemplary system 100 may comprise a power supply integrated circuit 110. The power supply integrated circuit 110, in turn, may comprise a plurality of power regulator modules 120-140. The power supply integrated circuit 110 may also comprise a regulator control module 160 that controls various operational aspects of the power regulator modules 120-140. The power supply integrated circuit 110 may further comprise a communication interface module 150 that, for example, communicates information between the power supply integrated circuit 110 and other devices over a shared data bus 155. The exemplary system 100 may also comprise an assortment of exemplary apparatus 122, 132, 142 coupled to the power regulator modules 120-140 of the power supply integrated circuit 110.

The following discussion will present exemplary aspects of the aforementioned components. It should be noted that various modules of the power supply integrated circuit 110 may comprise hardware, software or a combination thereof. Also, various modules may share hardware and/or software with other modules. For example and without limitation, a first and second module may share processing circuitry or various common software routines. Accordingly, the scope of various aspects of the present invention should not be limited by characteristics of arbitrary boundaries (e.g., hardware or software boundaries) between modules.

The first power regulator module 120 may, for example, control at least one characteristic of a first power signal that is associated with the first power regulator module 120. For example and without limitation, the first power regulator module 120 (or any other power regulator module, including the second power regulator module 130 and the third power regulator module 140) may comprise circuitry that generates switching commands to control power supply switching circuitry 122 that is external to the power supply integrated circuit 110, where the switching circuitry 122 outputs the first power signal.

Alternatively for example, the first (or any) power regulator module 120 may comprise an active portion of a power supply circuit that provides electrical power to an array of passive components external to the power supply integrated circuit 110 (e.g., inductive and capacitive devices in a buck or boost configuration), where the passive components output the first power signal. Such a configuration may, for example, be generally shown in FIG. 1 with the power supply passive components 132 coupled to the second power regulator module 130. Alternatively for example, the first (or any) power regulator module 120 may comprise a self-contained power supply circuit that directly outputs the first power signal. Such a configuration may, for example, be illustrated in FIG. 1 with the powered integrated circuit(s) 142 coupled to the third power regulator module 140.

The first power regulator module 120 may, for example, control any of a variety of power supply characteristics of the first power signal (e.g., in known or yet to be developed manners). For example and without limitation, the first power regulator module 120 may control voltage level of the first power signal. Also for example, the first power regulator module 120 may control various voltage variability characteristics of the first power signal (e.g., tolerance range limits, ripple, noise, statistical variance, etc.). Further for example, the first power regulator module 120 may control various load response characteristics of the first power signal (e.g., response time to changing load, load step response, load regulation, etc.). Still further for example, the first power regulator module 120 may control various electrical current characteristics of the first power supply signal (e.g., current limits, current spike suppression, current change response time, line regulation, etc.). Yet further for example, the first power regulator module 120 may control turn-on time, turn-off time, temperature drift, power supply rejection ratio, etc.).

In general, the first power regulator module 120 may control any of a variety of power supply characteristics related to the first power signal. Accordingly, the scope of various aspects of the present invention should not be limited by any particular power supply characteristic or by any particular manner in which any particular power supply characteristic may be controlled by a power regulator.

As will be discussed later, operation of the first power regulator module 120 may be controlled by one or more regulator control signals. For example and without limitation, the first power regulator module 120 may receive a regulator control signal from another module of the power supply integrated circuit 110 (e.g., a regulator control module). Also for example, the first power regulator module 120 may receive a regulator control signal directly from a device external to the power supply integrated circuit 110 over a shared data bus 155 (i.e., a data bus over which regulator control signals or messages related to regulator control may be received for any of a plurality of power regulator modules of the power supply integrated circuit 110). Further for example, the first power regulator module 120 may receive a regulator control signal from a communication interface module of the power supply integrated circuit 110, which may be coupled to a data bus. In general, operation of the first power regulator module 120 may be controlled by one or more regulator control signals received from any of a variety of sources. Accordingly, the scope of various aspects of the present invention should not be limited by characteristics of a particular source of a regulator control signal.

A regulator control signal, used to control operation of a power regulator module, may comprise any of a variety of signal characteristics. For example, such a regulator control signal may be analog or digital. Such a regulator control signal may, for example, comprise data carried in a received signal or data retrieved from a memory device. Such a regulator control signal may comprise information that may be utilized by a power regulator module to control any of a variety of characteristics of a corresponding power signal (e.g., as discussed previously). Such a regulator control signal may, for example, be a control signal directed only to a single power regulator module (e.g., the first power regulator module 120) or may be directed (e.g., broadcast or multi-cast) to a plurality of power regulator modules. Accordingly, the scope of various aspects of the present invention should not be limited by characteristics of a particular regulator control signal.

Portions of the previous discussion focused on the first power regulator module 120 and a first power signal related to the first power regulator module 120. It must be noted that any or all of the characteristics discussed previously with regard to the first power regulator module 120 may be shared by the second power regulator module 130, with corresponding second power signal, the third power regulator module 140, with corresponding third power signal, or an $n^{th}$ power regulator, with corresponding $n^{th}$ power signal.

As mentioned previously, the power supply integrated circuit 110 may comprise a communication interface module 150. The communication interface module 150 may, for example, receive power control information over the shared data bus 155. In an exemplary scenario, the communication interface module 150 may receive first power control information over the shared data bus 155, where the first power control information comprises information related to a first power signal that, in turn, corresponds to the first power regulator module 120. Continuing the exemplary scenario, the communication interface module 150 may also receive second power control information over the shared data bus 155, where the second power control information comprises information related to a second power signal that, in turn, corresponds to the second regulator module 130. Continuing the exemplary scenario, the communication interface module 150 may also receive third power control information over the shared data bus 155, where the third power control information comprises information related to a third power signal that, in turn, corresponds to the third regulator module 140 and also related to the first power signal that, in turn, corresponds to the first regulator module 120.

As discussed previously, the first power regulator module 120 may receive a control signal directly from a device external to the power supply integrated circuit 110 over the shared data bus 155. For example and without limitation, various aspects of the communication interface module 150 and/or the regulator control module 160 may be integrated with the first power regulator module 120 (or, for example, the second power regulator module 130 or third power regulator module 140). As a non-limiting alternative example, the dashed lines 156a-c in FIG. 1 illustrates daisy chaining the power regulator modules 120, 130, 140 for communication over the shared data bus 155. The scope of various aspects of the present invention should not be limited by characteristics of a particular communication path between the shared data bus 155 and various power supply modules.

The power control information may comprise any of a variety of characteristics related to information associated with power control. For example and without limitation, the power control information may comprise a request or command for one or more particular power signal characteristic. Also for example, the power control information may comprise a request or command for a change in one or more particular power signal characteristic. Further for example, the power control information may comprise information indicative of one or more power signal characteristics (e.g., indicative of a power signal received by a device originating the power control information.). Still further for example, the power control information may comprise information related to the enablement and disablement of various power signals and/or associated regulator modules.

In an exemplary scenario, first power control information may comprise information related to at least one characteristic of a first power signal (e.g., as associated with the first power regulator module 120). A variety of such characteristics were discussed previously (e.g., voltage level and variability, current level and variability, load response characteristics, etc.). Also, for example and without limitation, the first power control information may comprise information related to at least one characteristic of a second power signal (e.g., as associated with the second power regulator module 130).

Continuing the exemplary scenario, second power control information may comprise information related to at least one characteristic of a second power signal (e.g., as associated with the second power regulator module 130). The second power control information may, for example, comprise information related to only the second power signal. Alternatively, for example, the second power control information may also comprise information related to other power signals.

In general, the power control information may comprise any of a variety of characteristics related to information associated with power control. Accordingly, the scope of various aspects of the present invention should not be limited by characteristics of any particular type of information related to power control.

Power control information (e.g., as received by the communication interface module 150 over the shared data bus 155) may comprise unsolicited power control information (i.e., power control information that is not requested (e.g., requested by the power supply integrated circuit 110). Alternatively, for example, the power control information may comprise solicited power control information (e.g., information sent in response to a request by the power supply integrated circuit 110 for such information). Such a request may, for example, be directed (or addressed) to a device, or multi-cast or broadcast to a plurality of devices. In a scenario where the power supply integrated circuit 110 communicates a request for power control information to a device external to the power supply integrated circuit 110, the power supply integrated circuit 110 may (e.g., utilizing the communication interface module 150) communicate such a request to the external device over the shared data bus 155.

For example and without limitation, continuing the exemplary scenario mentioned above, the first power control information may arrive from a first device external to the power supply integrated circuit 110 (e.g., a first external device receiving the first power signal associated with the first power regulator module 120), and the second power control information may arrive from a second device external to the power supply integrated circuit 110 (e.g., a second external device receiving the second power signal associated with the second power regulator module 120). Alternatively, for example, the first and second power control information may arrive from the same device (e.g., a device receiving the first and second power signals). In general, the power control information may arrive from any of a variety of sources external to the power supply integrated circuit 110. Accordingly, the scope of various aspects of the present invention should not be limited by characteristics of a particular source of the power control information.

As mentioned previously, incoming power control information (and potentially, outgoing requests for such information) may be communicated over the shared data bus 155. The shared data bus 155 may generally provide for the communication of power control information and/or associated requests with devices external to the power supply integrated circuit 110. For example, the shared data bus 155 may provide for the communication of power control information related to operation of any of a plurality of power regulator modules of the power supply integrated circuit 110 (e.g., including the first power regulator module 120, the second power regulator module 130 and/or the third power regulator module 140).

The shared data bus 155 may comprise characteristics of any of a variety of data bus types. For example and without limitation, the shared data bus 155 may be a serial data bus. Also for example, the shared data bus 155 may be a parallel bus. Also for example, the shared data bus 155 may be bidirectional (e.g., able to communicate information to and from the power supply integrated circuit 110). Further for example, the shared data bus 155 may be unidirectional. In various exemplary scenarios, the shared data bus 155 may be substantially or completely dedicated to the communication of power-related information. In various other exemplary scenarios, the shared data bus 155 may comprise characteristics of a more general-purpose data bus (i.e., communicating a significant amount of non-power-related information).

The shared data bus 155 may, for example and without limitation, utilize a wired transmission medium. For example, such a wired transmission medium may be conductively coupled to one or more pins of the power supply integrated circuit 110. In various alternative scenarios, the shared data bus 155 may comprise characteristics of an optical and/or wireless transmission medium.

In general, the shared data bus 155 may comprise characteristics of any of a variety of data bus types. Accordingly, the scope of various aspects of the present invention should not be limited by characteristics of a particular type of data bus, including communication medium characteristics.

As mentioned previously, the power control information may comprise solicited power control information (e.g., information sent in response to a request by the power supply integrated circuit 110 for such information). Such a request may, for example, be directed (or addressed) to a device, or multi-cast or broadcast to a plurality of devices. In an exemplary scenario, the power supply integrated circuit 110 may also communicate a response message to a source of received power control information. For example and without limitation, the power supply integrated circuit 110 (or a module thereof) may communicate an acknowledgement message to a source of the power control information to acknowledge receipt of the power control information.

Also for example, a response message may comprise information related to the processing of the received power control information (e.g., information indicative of power characteristic adjustments associated with the received power control information). Further for example, a response message may comprise a request for additional information from the source of the received power control information. Such additional information may, for example and without limitation, comprise information related to power supply measurements, operating mode, real-time operating conditions, device priority, device identification, etc. In general, the power supply integrated circuit 110 (or a module thereof) may communicate a response message to a source of power control information. Accordingly, the scope of various aspects of the present invention should not be limited by characteristics of a particular message that may be sent in response to the receipt of power control information.

The power supply integrated circuit may comprise a regulator control module 160. The regulator control module 160 may, for example, generate one or more regulator control signals to control operation of one or more of the power regulator modules 120-140. Various aspects of such regulator control signals were discussed previously. Note that, as discussed previously, various modules may share various portions of hardware and/or software. As an example, consider the regulator control module 160 to be discussed. Various aspects of the exemplary regulator control module 160 may be integrated with the power regulator modules 120-140. For example, as discussed below, the regulator control module 160 may generate one or more regulator control commands for a power regulator module. In such an exemplary scenario, the portion of the regulator control module 160 that generates such a command may be closely integrated with the power regulator module receiving the command. Reemphasizing a statement made previously, the scope of various aspects of the present invention should not be limited by characteristics of arbitrary boundaries between various modules.

In an exemplary scenario, the regulator control module 160 may receive first power control information (e.g., over the shared data bus 155 and through the communication interface module 150). The regulator control module 160 may then, for example, determine which one or more of the plurality of power regulator modules 120-140 the received first power control information relates to. For example and without limitation, the regulator control module 160 may analyze addressing information (or other destination identification information) in the first power control information to determine which of the power regulator modules 120-140 the received first power control information corresponds to. Also for example, the regulator control module 160 may analyze power signal identification information in the first power control information and analyze a cross-list of power signals to power regulator modules to determine which of the power regulator modules 120-140 the received first power control information corresponds to.

Further for example, the regulator control module 160 may analyze message identification information in the received power control information to determine which power regulator module the received power control information corresponds to. For example, the power control information may comprise information identifying an information request message to which the power control information is responsive. The identification of the request message may then be utilized to correlate the received power control information to a particular power regulator module.

The regulator control module 160 may then, for example, process the received first power control information to determine one or more regulator control signals that, when communicated to the determined power regulator module(s), cause the power regulator module(s) to output (or cause to be output) electrical power having at least one characteristic that is based, at least in part, on the received first power control information. For example, the regulator control module 160 may communicate a first regulator control signal to the first power regulator module 120.

Continuing the exemplary scenario, the regulator control module 160 may (e.g., over the shared data bus 155 and through the communication interface module 150) receive second power control information. The regulator control module 160 may then, for example, determine that the second power control information corresponds to the second regulator module 130. The regulator control module 160 may then, for example, determine a regulator control signal that, when communicated to the second power regulator module 130, causes the second power regulator module 130 to output (or cause to be output) electrical power having at least one characteristic that is based, at least in part, on the received second power control information.

Note that the regulator control module 160 may determine regulator control signals based on a variety of received power control information. For example, in an exemplary scenario, the regulator control module 160 may (e.g., over the shared data bus 155 and through the communication interface module 150) receive first power control information and second power control information. The regulator control module 160 may then, for example, determine that the received first and second power control information both relate to first electrical power corresponding to the first power regulator module 120. The regulator control module 160 may, for example, process both the first and second power control information to determine a regulator control signal to communicate to the first power regulator module 120.

Also note that the regulator control module 160 may determine a plurality of regulator control signals (e.g., corresponding to a plurality of power regulator modules) from a single set of received power control information. For example and without limitation, a first external device may receive first and second power, which may, for example, correspond to the first and second power regulator modules 120, 130. The first external device may then (either synchronously or asynchronously) communicate power control information to the power supply integrated circuit 110. The regulator control module 160 may then, for example, process such power control information to determine respective regulator control signals to communicate to the first and second power regulator modules 120, 130. The first and second power regulator modules 120, 130 may then operate in accordance with their respective regulator control signals.

In various exemplary scenarios, the regulator control module 160 may receive a variety of power control information related to a particular power regulator module, where such power control information was transmitted from a plurality of external devices receiving the same power signal corresponding to the particular power regulator module. For example and without limitation, the regulator control module 160 may receive first power control information from a first electrical device external to the power supply integrated circuit 110, which receives and utilizes a first power signal that is associated with the first power regulator module 120. The regulator control module 160 may also receive second power control information from a second electrical device external to the power supply integrated circuit 110, which also receives and utilizes the first power signal.

In such an exemplary scenario, the regulator control module 160 may arbitrate between the needs of the first and second external devices. For example, the regulator control module 160 may process the first and second power control information to determine a regulator control signal to communicate to the first power regulator module 120 to cause an adjustment to a characteristic of the first power signal. Such arbitration between power supply needs of a plurality of devices may, for example, be based on device priority, averaging, weighted averaging, a predetermined operating profile, etc. In general, the regulator control module 160 may arbitrate between the power supply needs of a plurality of external devices. Accordingly, the scope of various aspects of the present invention should not be limited by characteristics of a particular arbitration strategy or any manner of processing power control information received from a plurality of source devices.

As mentioned previously, the power supply integrated circuit 110 may communicate a response message to a source of power control information. The regulator control module 160 may, for example, determine whether to communicate such a message and determine the contents of such a message. As mentioned previously, such a response message may, for example and without limitation, comprise acknowledgement information, processing result information, a request for further information, etc.

Also as mentioned previously, the power supply integrated circuit 110 may communicate to various devices a request for power control information. The regulator control module 160 may, for example, manage such communications. For example and without limitation, the regulator control module 160 may determine that a particular type of power control information is desired from a device and communicate a message to the device requesting the desired power control information.

The previous discussion presented various aspects of an exemplary system 100 having a power supply integrated circuit 110 comprising multiple power regulator modules 120-140 controlled, at least in part, by information communicated through a shared data bus 155, in accordance with various aspects of the present invention. The exemplary system 100 was presented to provide specific illustrations of a portion of generally broader aspects of the present invention. Accordingly, the scope of various aspects of the present invention should not be limited by characteristics of the exemplary specific illustrations discussed previously.

Figure 2:
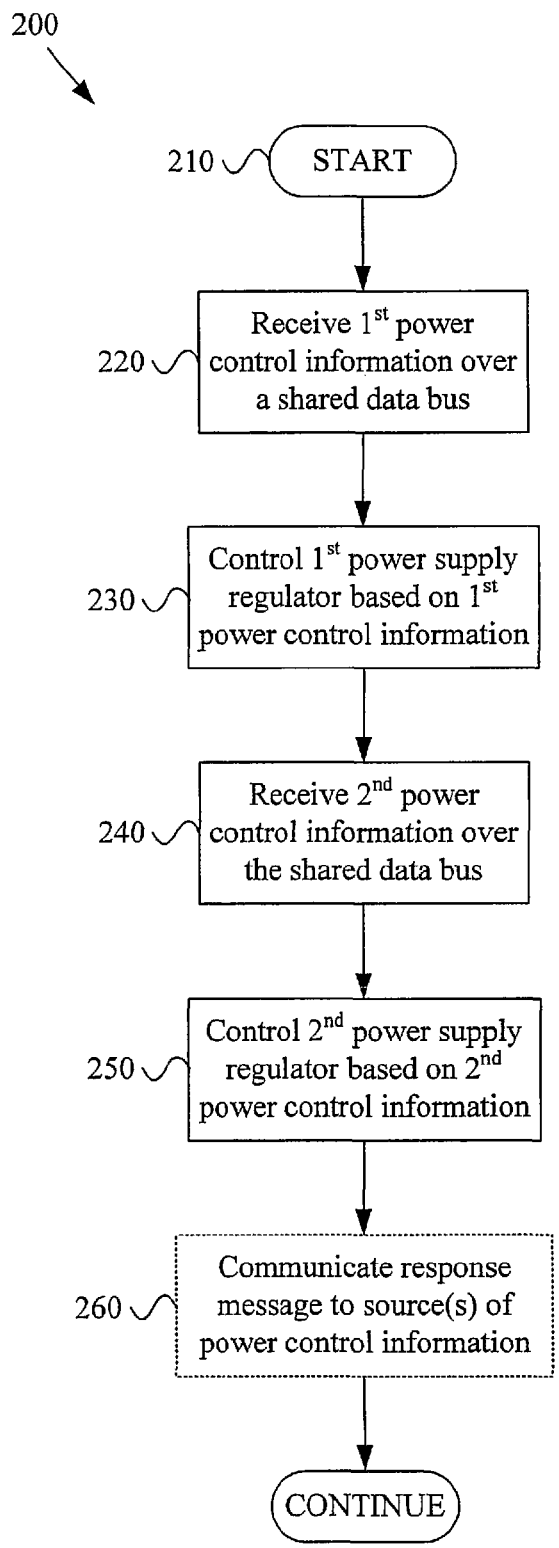
FIG. 2 illustrates an exemplary method for controlling multiple regulators in an integrated circuit utilizing a shared data bus, in accordance with various aspects of the present invention.

FIG. 2 illustrates an exemplary method 200 for controlling multiple regulators in an integrated circuit utilizing a shared data bus, in accordance with various aspects of the present invention. Various aspects of the exemplary method 200 may, for example and without limitation, share characteristics with various functional aspects of the exemplary system 100 illustrated in FIG. 1 and discussed previously.

The exemplary method 200 may begin at step 210. The exemplary method 200 (and other methods discussed herein) may begin for any of a variety of reasons. For example and without limitation, the exemplary method 200 may begin automatically upon system reset or power-up. Also for example, the exemplary method 200 may begin in response to a direct user command or a command generated by a system device. Further for example, the method 200 may begin in response to real-time system operating conditions. Accordingly, the scope of various aspects of the present invention should not be limited by characteristics of any particular initiating cause or condition.

The method 200 may, at step 220, comprise receiving first power control information over a data bus (e.g., a shared data bus). Step 220 may, for example and without limitation, share various characteristics with the functionality of the exemplary communication interface module 150 of the exemplary power supply integrated circuit 100 illustrated in FIG. 1 and discussed previously.

Various exemplary aspects of power control information were discussed previously in the discussion related to FIG. 1. For example and without limitation, the power control information may comprise information related to various characteristics of a power signal. For example, such characteristics may comprise voltage and/or current level, voltage and/or current variability characteristics, voltage and/or current response characteristics, power signal enablement/disablement information, etc. Such power control information may, for example, be communicated from a device external to a power supply integrated circuit implementing the method 200. For example, such power control information may be solicited or unsolicited. Accordingly, the scope of various aspects of the present invention should not be limited by characteristics of particular power control information.

Additionally, various exemplary aspects of a data bus (in particular, a shared data bus) were discussed previously in the discussion related to FIG. 1. The data bus may, for example and without limitation, share various characteristics with the shared data bus 155 of the exemplary system 100 illustrated in FIG. 1 and discussed previously.

For example and without limitation, the data bus may comprise characteristics of a serial or parallel data bus. The data bus may, for example, comprise characteristics of a bidirectional or unidirectional data bus. The data bus may, in various exemplary scenarios, comprise characteristics of a dedicated power control information data bus or a general-purpose data bus. Additionally, the data bus may utilize various communication media, including for example, wired, wireless RF, or optical communication media. Accordingly, the scope of various aspects of the present invention should not be limited by characteristics of a particular data bus type or communication medium.

The method 200 may, at step 230, comprise controlling a first power regulator based, at least in part, on the first power control information received at step 220. The first power regulator may, for example and without limitation, share various characteristics with the first power regulator module 120 of the exemplary power supply integrated circuit 110 illustrated in FIG. 1 and discussed previously. Step 230 may also, for example and without limitation, share various characteristics with the functionality of the regulator control module 160 of the power supply integrated circuit 110 illustrated in FIG. 1 and discussed previously.

In an exemplary scenario, where a first power signal is related to the first power regulator, step 230 may comprise controlling at least one power supply characteristic of the first power signal by controlling operation of the first power regulator. For example and without limitation, in an exemplary scenario, the first power control information may comprise information related to a first voltage level of the first power signal. Step 230, in such an exemplary scenario, may comprise controlling operation of the first power regulator to control the first voltage level of the first power signal based, at least in part, on the information related to the first voltage level.

In an exemplary scenario, step 230 may comprise controlling the at least one characteristic of the first power signal by generating a first regulator control signal based, at least in part, on the first power control information, and communicating the first regulator control signal to the first power regulator.

The exemplary method 200 may, at step 240, comprise receiving second power control information over the data bus (i.e., the data bus over which the first power control information was received at step 220). Step 240 may, for example and without limitation, share various characteristics with step 220 discussed previously. Also for example and without limitation, step 240 may share various characteristics with the functionality of the exemplary communication interface module 150 of the exemplary power supply integrated circuit 100 illustrated in FIG. 1 and discussed previously.

The method 200 may, at step 250, comprise controlling a second power regulator based, at least in part, on the second power control information received at step 240. The second power regulator may, for example and without limitation, share various characteristics with the second power regulator module 130 of the exemplary power supply integrated circuit 110 illustrated in FIG. 1 and discussed previously. Step 250 may also, for example and without limitation, share various characteristics with the functionality of the regulator control module 160 of the power supply integrated circuit 110 illustrated in FIG. 1 and discussed previously.

In an exemplary scenario, where a second power signal is related to the second power regulator, step 250 may comprise controlling at least one power supply characteristic of the second power signal by controlling operation of the second power regulator. For example and without limitation, in an exemplary scenario, the second power control information may comprise information related to a second voltage level of the second power signal. Step 250, in such an exemplary scenario, may comprise controlling operation of the second power regulator to control the second voltage level of the second power signal based, at least in part, on the information related to the second voltage level.

In an exemplary scenario, step 250 may comprise controlling the at least one characteristic of the second power signal by generating a second regulator control signal based, at least in part, on the second power control information, and communicating the second regulator control signal to the second power regulator.

Note that, as discussed previously with regard to the regulator control module 160 of FIG. 1, step 250 may also, for example, comprise controlling operation of the second power regulator based, at least in part, on the first power control information received at step 220. Such control may, for example, comprise performing arbitration or otherwise processing both the first and second power control information, as discussed previously.

The exemplary method 200 may, at step 260, comprise communicating a response message to a source of received power control information. Step 260 may, for example and without limitation, share various response-related characteristics of the functionality discussed previously with regard to the regulator control module 160 of the power supply integrated circuit 110 discussed previously. For example, such a response message may comprise acknowledgement information, results of processing the corresponding received power information, a request for additional power control information, etc.

The exemplary method 200 was presented to provide specific illustrations of a portion of generally broader aspects of the present invention. Accordingly, the scope of various aspects of the present invention should not be limited by specific characteristics of the exemplary method 200.

Figure 3:
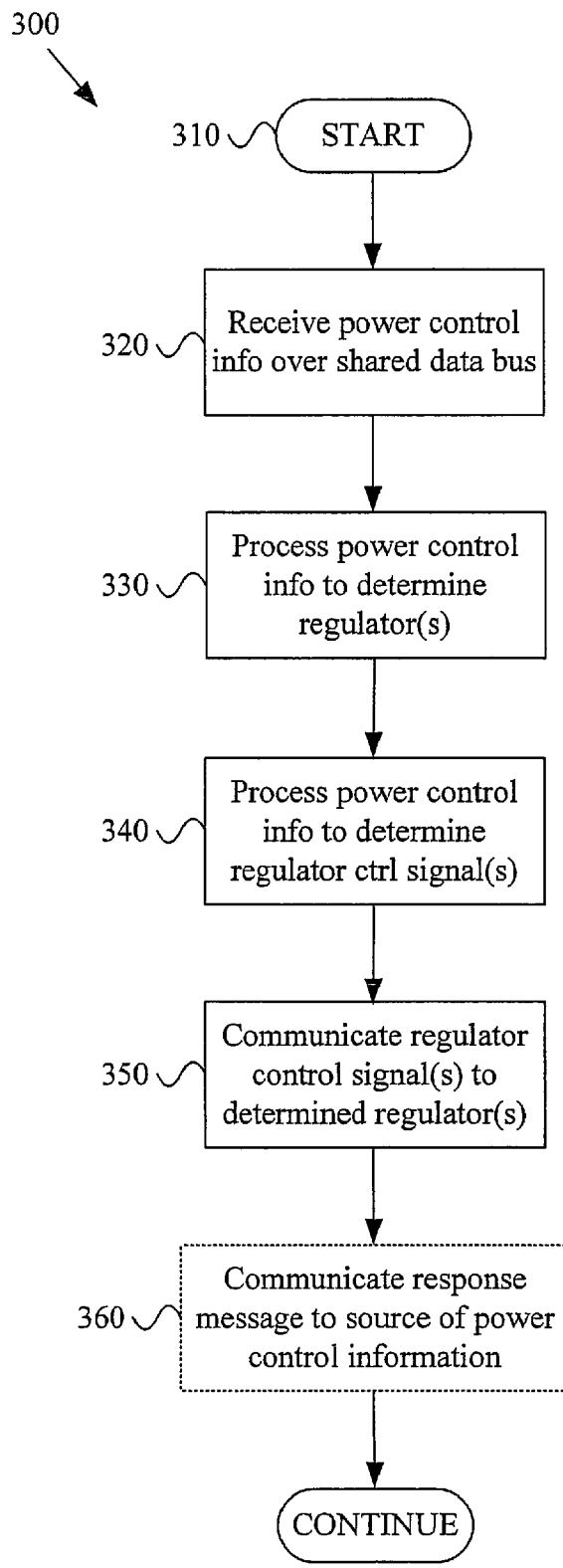
FIG. 3 illustrates an exemplary method for controlling multiple regulators in an integrated circuit utilizing a shared data bus, in accordance with various aspects of the present invention.

FIG. 3 illustrates an exemplary method 300 for controlling multiple regulators in an integrated circuit (e.g., a power supply integrated circuit) utilizing a shared data bus, in accordance with various aspects of the present invention. Various aspects of the exemplary method 300 may, for example and without limitation, share characteristics with various aspects of the method 200 illustrated in FIG. 2 and discussed previously and various functional aspects of the exemplary system 100 illustrated in FIG. 1 and discussed previously.

The method 300 may, at step 320, comprise receiving first power control information over a data bus (e.g., a shared data bus). Step 320 may, for example and without limitation, share various characteristics with steps 220 and 240 of the exemplary method 200 illustrated in FIG. 2 and discussed previously and with the functionality of the exemplary power supply integrated circuit 110 (e.g., the communication interface module 150) illustrated in FIG. 1 and discussed previously.

Various exemplary aspects of power control information were discussed previously in the discussions related to FIGS. 1 and 2. Additionally, various exemplary aspects of a data bus (in particular, a shared data bus) were discussed previously in the discussions related to FIGS. 1 and 2. Accordingly, the scope of various aspects of the present invention should not be limited by any particular power control information or by characteristics of a particular data bus type.

The method 300 may, at step 330, comprise determining which of the plurality of power regulators in the integrated circuit correspond to the power control information received at step 320. Step 330 may, for example and without limitation share various characteristics with the functionality of the regulator control module 160 illustrated in FIG. 1 and discussed previously.

For example, step 330 may comprise analyzing the power control information received at step 320 to correlate the power control information to one or more of the plurality of power regulators. For example and without limitation, the power control information may comprise an indication of a particular power signal that corresponds to a particular power regulator. Also for example, the power control information may comprise information specifically identifying (e.g., addressing) a particular power regulator. Further for example, the power control information may, in an exemplary scenario where the power control information is responsive to a request for such information, comprise information identifying the request for such information, which step 330 may correlate to a particular power regulator.

The exemplary method 300 may, at step 340, comprise determining a regulator control signal that corresponds to the received power control information. Step 340 may, for example and without limitation, share various characteristics with exemplary steps 230 and 250 of the exemplary method 200 illustrated in FIG. 2 and discussed previously and with various aspects of the functionality performed by the exemplary regulator control module 160 illustrated in FIG. 1 and discussed previously.

Step 340 may, for example, analyze the power control information received at step 320 to determine one or more regulator control signals that, when communicated to the regulator(s) identified at step 330, will cause the regulator(s) to output (or cause to be output) electrical power having one or more particular characteristics.

Note that step 340 may comprise determining the regulator control signal(s) based on information in addition to the power control information most recently received at step 320. For example, step 340 may utilize other information (e.g., information previously received and/or stored) to determine the regulator control signal(s).

In a non-limiting exemplary scenario, the power control information received at step 320 may comprise information requesting a particular power supply voltage level for a particular power signal. Step 330 may then comprise determining which of the power regulators corresponds to the particular power signal, and step 340 may then comprise determining a regulator control signal that, when communicated to the identified regulator, will result in the particular power signal having the requested power supply voltage level.

The exemplary method 300 may, at step 350, comprise communicating the one or more regulator control signals determined at step 340 to the one or more power regulators determined at step 330. Step 350 may, for example and without limitation, share various characteristics with exemplary steps 230 and 250 illustrated in FIG. 2 and discussed previously and with various aspects of the functionality of the regulator control module 160 illustrated in FIG. 1 and discussed previously.

The exemplary method 300 may, at step 360, comprise communicating a response message to a source of the power control information received at step 320. Step 360 may, for example and without limitation, share characteristics with step 260 illustrated in FIG. 2 and discussed previously and with various aspects of functionality discussed previously with regard to the regulator control module 160 illustrated in FIG. 1 and discussed previously.

The exemplary method 300 was presented to provide specific illustrations of a portion of generally broader aspects of the present invention. Accordingly, the scope of various aspects of the present invention should not be limited by specific characteristics of the exemplary method 300.

As stated previously, and as reemphasized here, various modules of an electrical circuit or system incorporating various aspects of the present invention may be implemented in hardware and/or software, which may be shared between modules. It is stressed that the scope of various aspects of the present invention should not be limited by arbitrary notions of boundaries (either hardware or software) between modules. The scope of various aspects of the present invention should not be limited by characteristics of any particular implementation.

In summary, various aspects of the present invention provide a system and method for implementing a common control bus in a multi-regulator power supply chip. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An integrated circuit comprising:
a first power regulator module operable to control at least one characteristic of a first power signal;
a second power regulator module operable to control at least one characteristic of a second power signal; and
at least one module operable to, at least:
communicate a message requesting first power control information corresponding to the first power signal;
receive the requested first power control information over a data bus, and receive second power control information corresponding to the second power signal over the data bus; and
generate a first regulator control signal based, at least in part, on the first power control information and communicate the first regulator control signal to the first power regulator module.

2. The integrated circuit of claim 1, wherein the data bus is a serial data bus.

3. The integrated circuit of claim 1, wherein the data bus is a bidirectional data bus.

4. The integrated circuit of claim 1, wherein the first power control information comprises information related to the at least one characteristic of the first power signal.

5. The integrated circuit of claim 4, wherein the first power control information comprises information of voltage level of the first power signal.

6. The integrated circuit of claim 4, wherein the first power control information comprises information of voltage variability of the first power signal.

7. The integrated circuit of claim 4, wherein the first power control information comprises information of electrical current associated with the first power signal.

8. The integrated circuit of claim 1, wherein the first power regulator module is further operable to receive the first regulator control signal from the at least one module of the integrated circuit and to receive a second regulator control signal directly from the data bus.

9. The integrated circuit of claim 1, wherein the at least one module is further operable to generate a second regulator control signal and communicate the second regulator control signal to the second power regulator module, wherein the second regulator control signal is based at least in part on the second power control information.

10. The integrated circuit of claim 1, wherein the at least one module is further operable to generate a second regulator control signal and communicate the second regulator control signal to the second power regulator module, wherein the second regulator control signal is based at least in part on the first power control information.

11. The integrated circuit of claim 1, wherein the at least one module is further operable to communicate a response message to a source of the received first power control information.

12. The integrated circuit of claim 11, wherein the at least one module is operable to communicate the response message to the source of the received first power control information over the data bus.

13. The integrated circuit of claim 11, wherein the response message comprises an acknowledgment message.

14. The integrated circuit of claim 11, wherein the response message comprises information indicative of power characteristic adjustments associated with the received first power control information.

15. The integrated circuit of claim 11, wherein the response message comprises a request for additional information from the source of the received first power control information.

16. The integrated circuit of claim 1, wherein the at least one module is operable to determine the first regulator control signal by, at least in part, operating to arbitrate between power supply needs of a plurality of devices.

17. The integrated circuit of claim 16, wherein the at least one module is operable to arbitrate between power supply needs of a plurality of devices based, at least in part, on respective priorities of the plurality of devices.

18. The integrated circuit of claim 16, wherein the at least one module is operable to arbitrate between power supply needs of a plurality of devices based, at least in part, on an average of respective power supply needs of the plurality of devices.

19. The integrated circuit of claim 16, wherein the at least one module is operable to arbitrate between power supply needs of a plurality of devices based, at least in part, on a weighted average of respective power supply needs of the plurality of devices.

20. The integrated circuit of claim 1, wherein the at least one module is operable to communicate the message requesting the first power control information, by at least in part, operating to communicate the message requesting the first power control information to a particular device.

21. The integrated circuit of claim 1, wherein the at least one module is operable to communicate the message requesting the first power control information, by at least in part, operating to communicate the message requesting the first power control information to circuitry external to the integrated circuit.

22. The integrated circuit of claim 1, wherein the at least one module is operable to communicate the message requesting the first power control information, by at least in part, operating to address the message requesting the first power control information to a particular device.

23. The integrated circuit of claim 1, wherein the at least one module is operable to communicate the message requesting the first power control information by, at least in part, operating to communicate the message requesting the first power control information to a plurality of devices.

24. In an integrated circuit comprising a first power regulator operable to control at least one characteristic of a first power signal and a second power regulator operable to control at least one characteristic of a second power signal, a method for controlling electrical power, the method comprising:
communicating a message requesting first power control information corresponding to the first power signal;
receiving the requested first power control information over a data bus;
receiving second power control information corresponding to the second power signal over the data bus;
controlling at least one characteristic of the first power signal by controlling operation of the first power regulator based, at least in part, on the first power control information; and
controlling at least one characteristic of the second power signal by controlling operation of the second power regulator based, at least in part, on the second power control information.

25. The method of claim 24, wherein the first power control information comprises information related to the at least one characteristic of the first power signal.

26. The method of claim 24, further comprising communicating a response message to a source of the received first power control information.

27. The method of claim 26, wherein communicating the response message comprises communicating the response message to the source of the received first power control information over the data bus.

28. The method of claim 26, wherein the response message comprises an acknowledgment message.

29. The method of claim 24, wherein controlling operation of the first power regulator comprises arbitrating between respective power supply needs of a plurality of devices.

30. The method of claim 24, wherein communicating a message requesting first power control information comprises communicating the message to a particular device.

31. The method of claim 24, wherein communicating a message requesting first power control information comprises communicating the message to circuitry external to the integrated circuit.

32. The method of claim 24, wherein communicating a message requesting first power control information comprises addressing the message to a particular device.

33. The method of claim 24, wherein communicating a message requesting first power control information comprises communicating the message to a plurality of devices.

* * * * *